United States Patent
Furusawa et al.

(10) Patent No.: US 7,621,970 B2
(45) Date of Patent: Nov. 24, 2009

(54) MANUFACTURING METHOD OF ELECTROLYTIC CAPACITOR

(75) Inventors: Shigetaka Furusawa, Kyoto (JP); Hiroyuki Matsuura, Shiga (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/368,442

(22) Filed: Feb. 10, 2009

(65) Prior Publication Data
US 2009/0144954 A1    Jun. 11, 2009

Related U.S. Application Data

(63) Continuation of application No. PCT/JP2007/066834, filed on Aug. 30, 2007.

(30) Foreign Application Priority Data

Sep. 7, 2006    (JP) .............................. 2006-242448

(51) Int. Cl.
*H01G 9/00* (2006.01)
*H01L 21/20* (2006.01)
(52) U.S. Cl. ............... 29/25.03; 438/381; 257/E21.008
(58) Field of Classification Search ................ 29/25.03; 438/381; 257/E21.008
See application file for complete search history.

(56) References Cited

U.S. PATENT DOCUMENTS

| 6,208,503 | B1* | 3/2001 | Shimada et al. ............. 361/523 |
| 6,329,096 | B2* | 12/2001 | Kawakami et al. ............ 429/49 |
| 6,375,688 | B1* | 4/2002 | Akami et al. ............... 29/25.03 |
| 2008/0204974 | A1* | 8/2008 | Yoshimitsu .................. 361/523 |
| 2008/0226983 | A1* | 9/2008 | Odani et al. ................ 429/200 |

FOREIGN PATENT DOCUMENTS

| JP | 64-090517 A | 4/1989 |
| JP | 07-249543 A | 9/1995 |
| JP | 10-256090 A | 9/1998 |
| JP | 11-186110 A | 7/1999 |
| JP | 2003-077766 A | 3/2003 |
| JP | 2006-114540 A | 4/2006 |

OTHER PUBLICATIONS

International Search Report for PCT/JP2007/066834.

* cited by examiner

*Primary Examiner*—Alexander G Ghyka
*Assistant Examiner*—Seahvosh J Nikmanesh
(74) *Attorney, Agent, or Firm*—Pearne & Gordon LLP

(57) ABSTRACT

An capacitor element is fabricated by winding an anode foil having a dielectric oxide film formed thereon, and a cathode foil subjected to a treatment of enlarging surface area in a manner that a separator is interposed therebetween. The capacitor element is immersed in a fluid dispersion containing conductive polymer fine particles dispersed therein. Thereafter, it is depressurized and dried so that the conductive polymer fine particles adhere to surfaces of fibers of the separator, fill between the fibers of the separator, and adhere to surfaces of the anode foil and the cathode foil in a manner that the adhesion and filling of the conductive polymer fine particles are such that an amount of the fine particles decreases from ends toward a center of the capacitor element. Then, it is impregnated with an electrolytic solution.

6 Claims, 1 Drawing Sheet

MANUFACTURING METHOD OF ELECTROLYTIC CAPACITOR

BACKGROUND OF THE INVENTION

1. Field of the Invention

The present invention relates to a method of manufacturing an electrolytic capacitor for use in various types of electronic devices.

2. Background Art

As an electronic device is used at higher frequencies, an electrolytic capacitor, i.e. one of the electronic components of the electronic device, is required to be more excellent in equivalent series resistance (hereinafter referred to as ESR) characteristics in a higher-frequency range and have larger capacitance. In recent years, to reduce the ESR in the high frequency range, studies have been made on a solid electrolytic capacitor that uses a conductive polymer having high electric conductivity as a solid electrolyte thereof. In order to satisfy the demand for larger capacitance, a solid electrolytic capacitor is produced, which having a wound structure in which an anode foil and a cathode foil are wound with a separator interposed therebetween to form a capacitor element and a conductive polymer is incorporated into the capacitor element.

Generally known methods of forming a conductive polymer inside the capacitor element in this wound solid electrolytic capacitor include chemical oxidative polymerization of 3,4-ethylene dioxythiophene monomers with p-ferric toluenesulfonate, and chemical oxidative polymerization of pyrrole monomers with ferric chloride or persulfate. In these methods, the capacitor element is impregnated with reactants for an in-situ reaction.

In another wound electrolytic capacitor proposed, both of a solid electrolyte composed of a conductive polymer, and an electrolytic solution are used as derivation materials of the cathode. Also in this case, similar to the above solid electrolytic capacitor, a monomer, oxidizing agent, and dopant impregnated into the capacitor element are used for chemical oxidative polymerization in forming a conductive polymer.

In still another electrolytic capacitor proposed, a conductive polymer is prepared in the separator to form a capacitor element, and an electrolytic solution is impregnated into the capacitor element.

However, for such a conventional wound solid electrolytic capacitor, in order to form a conductive polymer inside the capacitor element, reactants such as a monomer, dopant, and oxidizing agent are impregnated into the capacitor element and are reacted in situ. Thus, it is difficult to control the reactions uniformly in the capacitor element. Therefore, uniformly forming the conductive polymer requires a method of making plurality times of reaction. This complicates the process and increases the production cost.

Furthermore, the in-situ chemical reactions generate reaction by-produces and unreacted portions, and necessitate a cleaning process for removing these substances. This cleaning process needs be performed at every time of the reaction, resulting in one of the factors in the cost increase caused by the complicated process.

In addition, because a conductive polymer poor at recovering a dielectric oxide film (hereinafter referred as "oxide film") is used, it is difficult to form a capacitor having high withstand voltage. The obtained capacitor has a rated voltage as low as 25 to 30 V. Even in this rated voltage range, leakage current accidentally may increase or a defect in the oxide film may cause a short-circuit failure during use. The general method of improving the short-circuit resistance is to thicken the oxide film and thus increase the withstand voltage. However, in this case, as the thickness of the oxide film increases, the capacitance decreases. Thus, the capacitance per unit volume of the capacitor considerably decreases.

Furthermore, because sodium persulfate and p-ferric toluenesulfonate, i.e. strong acids, are used as a dopant and oxidizing agent, complete removal of the impurities inside the capacitor is difficult even with the cleaning process. Because these impurities adversely affect the oxide film as strong acids, the withstand voltage is lowered. Further, in a high humidity environment, the strong acids can be liberated in water and corrode each member. For these reasons, ensuring sufficient reliability is difficult.

In one of the electrolytic capacitors proposed, both of a solid electrolyte formed of a conductive polymer and an electrolytic solution are used as cathode derivation materials. However, the method of forming the conductive polymer is the same in the case of the above wound solid electrolytic capacitor. Thus impurities of a dopant and oxidizing agent that affect the withstand voltage and corrosiveness are present, and the electrolytic solution facilitates diffusion of the impurities inside the capacitor element. These phenomena considerably decrease the reliability. In addition, when both conductive polymer and electrolytic solution are used, a phenomenon in which a dopant contained in the conductive polymer leaches into the electrolytic solution, so-called a dedoping reaction, considerably decreases the electric conductivity. Thus the reliability is decreased. Further, the conductive polymer is polymerized by chemical reactions inside the capacitor element. These reactions form the conductive polymer in defective portions in the oxide film, which reduces the ESR. However, the effect in which the electrolytic solution recovers the defective portions in the oxide film is not exerted. Thus enhancing the withstand voltage is difficult.

In the electrolytic capacitor using a conductivity-imparted separator and an electrolytic solution, conductivity is imparted only to the separator. Thus the contact resistance to the anode and cathode foils is large, and the effect of reducing the ESR is small.

SUMMARY OF THE INVENTION

A method of manufacturing an electrolytic capacitor of the present invention includes the following steps:

A) forming a capacitor element by winding an anode foil having a dielectric oxide film thereon, and a cathode foil subjected to surface-enlarging treatment so that a separator is interposed therebetween;

B) immersing the capacitor element in a fluid dispersion containing conductive polymer fine particles dispersed therein;

C) depressurizing the capacitor element and drying the capacitor element, after the immersing the capacitor element in the fluid dispersion so that the conductive polymer fine particles adhere to surfaces of fibers of the separator, fill between the fibers of the separator, and adhere to surfaces of the anode foil and the cathode foil in a manner that the adhesion and filling of the conductive polymer fine particles are such that an amount of the fine particles decreases from ends toward a center of the capacitor element;

D) impregnating the capacitor element with an electrolytic solution after the adhesion and filling of the conductive polymer fine particles;

E) placing the capacitor element in a bottomed, metallic case; and

F) sealing an opening of the metallic case with a sealing member.

DETAILED DESCRIPTION OF THE INVENTION

Figure 1:
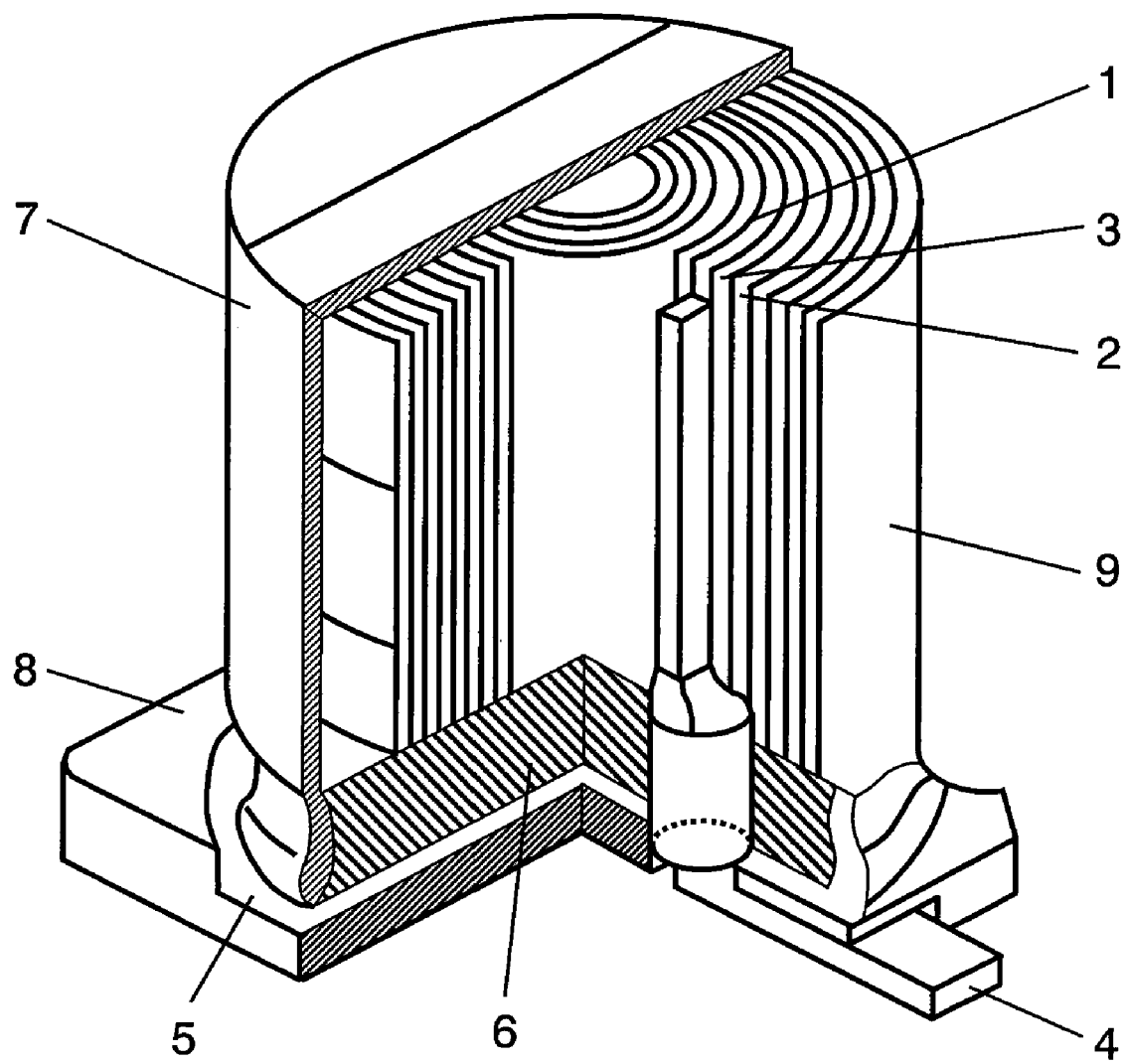
FIG. 1 is a partial sectional view in perspective illustrating a structure of an electrolytic capacitor in accordance with an exemplary embodiment of the present invention.

FIG. 1 is a partial sectional view in perspective illustrating a structure of an electrolytic capacitor in accordance with an exemplary embodiment of the present invention. Capacitor element 9 is formed by winding anode foil 1 and cathode foil 2 in a manner that separator 3 is interposed therebetween. Anode foil 1 is formed of an aluminum foil in which the surfaces thereof are roughened by etching for a treatment of enlarging the surface area, and thereafter a dielectric oxide film (hereinafter referred as "oxide film") is formed by anodizing. Cathode foil 2 is formed of an aluminum foil at least etched for a treatment of enlarging the surface area. Anode foil 1 and cathode foil 2 are connected to externally leading-out anode lead 4 and cathode lead 5, respectively.

Capacitor element 9 is placed in bottomed, cylindrical metallic case 7 made of aluminum, and the opening of metallic case 7 is sealed with sealing member 6 that has holes to be threaded with anode lead 4 and cathode lead 5.

In order to be surface-mounted, this electrolytic capacitor has insulating seat plate 8 made of an insulating resin that has holes threaded with anode lead 4 and cathode lead 5, respectively and is attached to the sealing member 6 side. Anode lead 4 and cathode lead 5 are bent along grooves provided in the external surface of insulating seat plate 8. Thus the electrolytic capacitor for surface mounting is provided.

Capacitor element 9 incorporates conductive polymer fine particles (not shown) adhering to the surfaces of the fibers of separator 3 and filling between the fibers, and is impregnated with an electrolytic solution. In other words, the conductive polymer fine particles adhere to the surfaces of the fibers of separator 3, fill between the fibers of separator 3, and adhere to the surfaces of anode foil 1 and cathode foil 2.

As mentioned above, as an electrolyte, an electrolytic solution is used in addition to the conductive polymer fine particles in the present embodiment. The electrolytic solution can easily be impregnated into minute etched pits formed by etching, which can derive the capacitance more efficiently. Because the conductive polymer fine particles are adsorbed onto the surfaces of the electrodes, no conductive polymer is formed inside the etched pits, unlike the conductive polymer formed by chemical polymerization. Thus the conductive polymer fine particles do not enter the defective portions in the oxide film, and the defective portions in the oxide film can sufficiently be recovered by the electrolytic solution. As a result, an electrolytic capacitor having a high withstand voltage can be fabricated.

As described above, the conductive polymer fine particles adhering to the surfaces of the fibers of separator 3 and filling between the fibers of separator 3, and the electrolytic solution used in combination can provide both larger capacitance and higher withstand voltage. Thus an electrolytic capacitor having both low ESR and high reliability can be fabricated.

Further, the adhesion and filling of the conductive polymer fine particles are such that the amount thereof decreases from the ends toward the center of capacitor element 9. With this structure, the capacitance after impregnation of the electrolytic solution can be derived and the defective portions in the oxide film can be recovered by the electrolytic solution more efficiently than a structure in which the entire surfaces are covered with the conductive polymer fine particles. It is preferable that the percentage of the adhesion and filling is in the range of 10 to 50% per volume of capacitor element 9 from the ends toward the center thereof.

As separator 3, material made of cellulose fibers or chemical fibers can be used. In particular, cellulose fiber has excellent reliability because cellulose fiber is thermally stable, and cellulose fiber formed into a separator having a density of 0.4 g/cm$^3$ or smaller has no defective portions, such as pinholes. For chemical fiber, the fiber diameter can be controlled freely. Thus the density of a separator can be controlled, suitable for the size of the conductive polymer fine particles.

For separator 3 having a density exceeding 0.4 g/cm$^3$, substances having a size at a molecular level, such as solution, can easily be impregnated into the capacitor element. However, the conductive polymer fine particles having a size of a submicron level or smaller have difficulty in entering the voids (spaces) in separator 3, and thus reduction of the ESR is small in this case. For this reason, it is preferable to set the density of separator 3 equal to or smaller than 0.4 g/cm$^3$.

As the material for conductive polymer fine particles, conductivity-imparted polythiophene, polypyrrole, and polyaniline can be used. Preferably, the size of the fine particle is 1 μm or smaller in diameter. When fine particles larger than 1 μm in diameter are used, it is difficult for the fine particles to fill the void in separator 3 and reduce the ESR. For this reason, such fine particles are not preferable.

Conductive polymer fine particles are used in the form of a fluid dispersion containing the fine particles dispersed therein so that the fine particles adhere to and fill separator 3. Preferable dispersion medias of this fluid dispersion are liquid media having low viscosity, such as water and lower alcohol. Further, a liquid medium having higher volatility can more easily be removed after the liquid medium containing the fine particles is impregnated into capacitor element 9. Thus the filling effect of the conductive polymer fine particles can be improved.

Further, it is preferable that the fluid dispersion includes a surface active agent because it can improve the impregnating ability of the fine particles so as to fill capacitor element 9 and separator 3 easily.

By using a surface active agent, the conductive polymer fine particles can easily be formed in capacitor element 9 without chemical polymerization in capacitor element 9. As a result, the process is simplified, and an electrolytic capacitor having a low ESR can be fabricated at low cost. Usable surface active agents to be added include anionic surface active agent, cationic surface active agent, and non-ionic surface active agent.

For cathode foil 2, an aluminum foil is typically used. When an aluminum foil subjected to chemical treatment to have an aluminum oxide formed on the surfaces thereof is used, the conductive polymer fine particles are more likely to adhere to the surfaces, which facilitates reduction of the ESR. Other than an aluminum oxide, a titanium oxide or a silicon oxide can be formed by a sol-gel process, or the like.

Further, it is preferable to form an oxide, carbide, or nitride on the surfaces of cathode foil 2. Forming an oxide, carbide, or nitride on the surfaces of cathode foil 2 can improve adhesion of the conductive polymer fine particles, thus further reducing the ESR. This is considered to result from greater affinity of conductive polymer fine particles for an oxide, carbide, or nitride than for a metal, such as aluminum, generally used for the electrode foil.

As the electrolyte of the electrolytic solution, a molten salt electrolyte is preferably used. Examples of the specific components of the electrolytic solution are shown below. However, the present invention is not limited to the following components of the electrolytic solution.

As the solvent for the electrolytic solution, following solvents can be used: an alcohol group (e.g. methanol, ethanol, propanol, butanol, cyclobutanol, cyclohexanol, ethylene glycol, propylene glycol, glycerin, methyl cellosolve, ethyl cellosolve, methoxy propylene glycol, and condensation polymers of a glycol group); non-protic organic solvent such as amide-based substances (e.g. N-methylformamide, N,N-dimethylformamide, N-ethylformamide, N,N-diethylformamide, N-methylacetamide, and N,N-dimethylacetamide), lactones (e.g. γ-butyrolactone, β-butyrolactone, α-valerolactone, and γ-valerolactone), and sulfoxides (e.g. sulfolane, 3-methyl sulfolane and dimethyl sulfoxide). Among these solvents, γ-butyrolactone, ethylene glycol, and sulfolane are thermally stable. The electrolytic solutions containing these solvents evaporate little in a reliability test of the capacitor in a high-temperature environment. Thus the electrolytic capacitor using a conductive polymer exhibits excellent short-circuit resistance when the electrolytic solution thereof dries up.

As the base component of the electrolyte, compounds having alkylated amidine groups, such as imidazole compounds, benzoimidazole compounds, and alicyclic amidine compounds (e.g. pyrimidine compounds and imidazoline compounds) can be used. Quaternary salts of compounds having alkylated amidine groups can also be used. Examples of such salts include imidazole compounds, benzoimidazole compounds, and alicyclic amidine compounds (e.g. pyrimidine compounds and imidazoline compounds) that are quanternized with alkyl groups or arylated alkyl groups having 1 to 11 carbon atoms. In particular, an amidine compound forms a molten salt with acid and thus has low volatility. For this reason, the electrolyte containing an amidine compound is likely to remain when the electrolytic solution dries up, and the capacitor exhibits excellent short-circuit resistance. When an amidine salt is used for the electrolyte of the electrolytic solution, the amidine salt remaining inside the capacitor even after a long-term high-temperature test can maintain the recoverability of the oxide film. This phenomenon allows the capacitor to have no short circuits even after a long-term high-temperature test and thus high reliability.

Further, an amidine compound has lower alkalescency than a quaternary ammonium salt, and thus is more excellent in resistance to fluid leakage at high temperature and humidity, and dedoping characteristics. A tertiary amine has low alkalescency and thus is also effective in suppressing the dedoping reaction. In combination with a solvent having low volatility, a tertiary amine allows the capacitor to ensure short-circuit resistance when the electrolytic solution thereof dries up.

As the acid component of the electrolyte, aliphatic carboxylic acids and aromatic carboxylic acids can be used. Aliphatic carboxylic acids include saturated carboxylic acid (e.g. oxalic acid, malonic acid, succinic acid, glutaric acid, adipic acid, pimelic acid, suberic acid, azelaic acid, sebacic acid, 1,6-decanedicarboxylic acid, 5,6-decanedicarboxylic acid, formic acid, acetic acid, propionic acid, butanoic acid, isobutyric acid, valeric acid, caproic acid, enanthic acid, caprylic acid, pelargonic acid, lauric acid, myristic acid, stearic acid, and behenic acid), and unsaturated carboxylic acid (e.g. maleic acid, fumaric acid, itaconic acid, acrylic acid, methacrylic acid, and oleic acid). Examples of aromatic carboxylic acid include phthalic acid, salicylic acid, isophthalic acid, terephthalic acid, trimellitic acid, pyromellitic acid, benzoic acid, resorcylic acid, cinnamic acid, and naphthoic acid. Preferable substances among these are highly-conductive and thermally-stable organic acids, such as phthalic acid, trimellitic acid, pyromellitic acid, maleic acid, salicylic acid, benzoic acid, and resorcylic acid. A complex of organic acid and boron is effective in suppressing the dedoping reaction, and thus is usable. In addition to these carboxylic acids, nitro derivatives and sulfonic acid derivatives of carboxylic acids, and derivatives of inorganic acids, e.g. phosphoric acid and boric acid, can be used. Addition of such a derivative in a number of moles larger than that of the above base component increases the acidity of the electrolytic solution and is effective in suppressing the dedoping reaction.

In addition, it is preferable that existence of acid components is more than base components in the electrolytic solution. More specifically, it is preferable that the number of moles of the acid components is larger than number of moles of the base components in the electrolyte. The molar ratio can suppress degradation of the conductive polymer in the high-temperature test. This advantage results from suppression of dedoping of a dopant material contained in the conductive polymer. Typically, an acid substance, such as sulfonic acid, is used as a dopant. Thus existence of an alkali component, such as amidine, in the electrolytic solution facilitates the movement of the dopant from the conductive polymer to the electrolytic solution. Such a dedoping reaction considerably decreases the electric conductivity of the conductive polymer. In order to suppress dedoping, the electrolytic solution contains acid components more than base components to provide an acid state. Thus a capacitor having high reliability can be fabricated.

Next, a description is provided of specific examples of this exemplary embodiment.

Example 1

After the surfaces of an aluminum foil are roughened by etching, an oxide film is formed thereon by anodizing (at a formation voltage of 45 V) to provide anode foil 1. An aluminum foil is etched to provide cathode foil 2. Anode foil 1 and cathode foil 2 are wound with cellulose separator 3 (having a thickness of 50 μm and a density of 0.40 g/cm$^3$) interposed therebetween. Thus capacitor element 9 is fabricated. Capacitor element 9 is immersed in a fluid dispersion (isopropyl alcohol fluid) containing 2% of conductivity-imparted polythiophene polymer fine particles (40 nm in diameter), and is moved to a depressurized state so that the fine particles fill capacitor element 9 (on the surfaces of the fibers, between the fibers of the separator, and on the surfaces of the anode and cathode foils). Thereafter, capacitor element 9 is left at an ambient temperature of 60° C. for five minutes, and further at a temperature of 120° C. for ten minutes for removal of excessive liquid medium. The adhesion and filling of conductive polymer fine particles 11 are such that an amount thereof decreases from ends toward a center of capacitor element 9 with the above-mentioned procedures.

Next, capacitor element 9 is immersed in a γ-butyrolactone solution containing a phthalate 1,2,3,4-tetramethyl imidazolinium salt (at a concentration of 25 wt %), p-nitrobenzonic acid (0.5 wt %), and monobutyl-phosphate ester (0.5 wt %) in a depressurized state. Hereinafter, this solution is referred to as an electrolytic solution A. Thus the electrolytic solution A is impregnated into the gaps (spaces) in capacitor element 9. The ratio of the number of moles between the acid components and base components in the electrolyte of the electrolytic solution A is 1:0.97.

Next, capacitor element 9 is placed in bottomed, cylindrical metallic case 7 made of aluminum, and the opening of metallic case 7 is sealed with sealing member 6 made of resin vulcanized butyl rubber by curling. Further, anode lead 4 and cathode lead 5 led from anode foil 1 and cathode foil 2, respectively, are threaded through insulating seat plate 8 made of polyphenylene sulfide. The leads are bent flat to fix insulating seat plate 8.

At last, the assembled one is stored with continuous application of 35V DC at an ambient temperature of 105° C. for one hour as an aging treatment. Thus a surface mount type electrolytic capacitor having a diameter of 10 mm and a height of 10 mm is fabricated.

Example 2

An electrolytic capacitor is fabricated in the same manner as Example 1 except that cellulose separator 3 (having a thickness of 50 μm and a density of 0.25 g/cm$^3$) is used.

Example 3

An electrolytic capacitor is fabricated in the same manner as Example 1 except that 1 wt % of anionic surface active agent (polystyrene sulfonate) is added to the fluid dispersion.

Example 4

An electrolytic capacitor is fabricated in the same manner as Example 1 except that an aluminum foil subjected to chemical treatment at a formation voltage of 2V is used as cathode foil 2.

Example 5

An electrolytic capacitor is fabricated in the same manner as Example 1 except that 4 wt % of pyromellitic acid, i.e. an organic acid, is added to the electrolytic solution A. The ratio of the number of moles between the acid components and base components in the electrolyte of the electrolytic solution is 1:0.9.

Example 6

In the same manner as Example 1, after the surfaces of an aluminum foil are roughened by etching, an oxide film is formed by anodizing (at a formation voltage of 45 V) to provide anode foil 1. An aluminum foil is etched to provide cathode foil 2. Anode foil 1 and cathode foil 2 are wound with cellulose separator 3 (having a thickness of 50 μm and a density of 0.40 g/cm$^3$) interposed therebetween. Thus capacitor element 9 is fabricated. Thereafter, capacitor element 9 is impregnated with a mixed solution of a thiophene monomer and a butanol solution of p-ferric toluenesulfonate, and heated. Thus a chemical polymerization reaction is caused to form a conductive polymer in capacitor element 9. Thereafter, capacitor element 9 is placed in bottomed, cylindrical metallic case 7 made of aluminum, and the opening of metallic case 7 is sealed with sealing member 6 made of resin vulcanized butyl rubber by curling. Further, anode lead 4 and cathode lead 5 led from anode foil 1 and cathode foil 2, respectively, are threaded through insulating seat plate 8 made of polyphenylene sulfide. The leads are bent flat to fix insulating seat plate 8.

At last, the assembled one is stored with continuous application of 35V DC at an ambient temperature of 105° C. for one hour. Thus a surface mount type electrolytic capacitor having a diameter of 10 mm and a height of 10 mm is fabricated.

Example 7

An electrolytic capacitor is fabricated in the same manner as Example 1 except that cellulose separator 3 (having a thickness of 50 μm and a density of 0.5 g/cm$^3$) is used.

Example 8

An electrolytic capacitor is fabricated in the same manner as Example 1 except that a γ-butyrolactone solution of a quaternary ammonium salt of phthalic acid is used as the electrolytic solution A.

Example 9

An electrolytic capacitor is fabricated in the same manner as Example 1 except that the electrolytic solution A contains a base component, i.e. 1,2,3,4-tetramethyl imidazolinium, at a concentration larger than that of Example 1 by 2 wt %. The ratio of the number of moles between the acid components and base components in the electrolyte of the electrolytic solution A is 1:1.2.

Twenty pieces of aluminum electrolytic capacitors are fabricated for each of the above Examples 1 to 9. As a life test, a voltage application test of 35 V is conducted on these capacitors at 105° C. The results are shown in Table 1. The ESR characteristics are measured at 100 kHz.

TABLE 1

| | Capacitance (μF) | ESR (mΩ) | Leakage current (μA) | Number of short circuits during aging teratment | After 2,000 hr. at 105° C. | |
|---|---|---|---|---|---|---|
| | | | | | ESR (mΩ) | Leakage current (μA) |
| Example 1 | 181 | 39 | 4 | 0/20 | 54 | 3 |
| Example 2 | 180 | 36 | 5 | 0/20 | 47 | 4 |
| Example 3 | 184 | 33 | 3 | 0/20 | 40 | 3 |
| Example 4 | 159 | 27 | 4 | 0/20 | 32 | 3 |
| Example 5 | 180 | 37 | 4 | 0/20 | 39 | 3 |
| Example 6 | 123 | 41 | 10 | 2/20 | 84 | 15 |
| Example 7 | 180 | 44 | 3 | 1/20 | 81 | 3 |
| Example 8 | 179 | 42 | 4 | 1/20 | 194 | 3 |
| Example 9 | 180 | 41 | 4 | 1/20 | 127 | 3 |

In the electrolytic capacitor of Example 1 in the present embodiment, the conductive polymer fine particles fill capacitor element 9 so as to concentrate on the ends thereof. Thus, as obvious from Table 1, the electrolytic capacitor of Example 1 has a larger capacitance and smaller change in characteristics after the high-temperature test, and thus higher reliability than those of Example 6 in which a conductive polymer is formed by a conventional chemical polymerization. Table 1 also shows the following results. In Example 2, the use of separator 3 having a lower density improves the impregnation of the conductive polymer fine particles and reduces the initial ESR, in comparison with the electrolytic capacitor of Example 7. In Example 3, addition of a surface active agent to the fluid dispersion of the fine particles improves the impregnation thereof into capacitor element 9, and reduces the initial ESR. In Example 4, formation of an oxide on cathode foil 2 further reduces the initial ESR.

In each of the electrolytic capacitors of Examples 1 to 5, an amidine salt is used as the electrolyte of the electrolytic solution A. Thus, even when the electrolytic solution dries up after high-temperature degradation, each of these capacitors has more excellent recoverability of the aluminum oxide film than the electrolytic capacitor of Example 8. Therefore, in each of these capacitors, the leakage current is more stable and the short-circuit resistance is more excellent. As shown in Example 5, excessive acid components in the electrolytic solution A considerably reduce a change in the ESR after high-temperature degradation, in comparison with the electrolytic capacitor of Example 9.

As described above, in the present invention, impregnating a capacitor element with conductive polymer fine particles can reduce equivalent series resistance (ESR). With the effective use of an electrolytic solution in combination, an electrolytic capacitor having excellent characteristics, such as higher capacitance, withstand pressure, and reliability, can be provided.

What is claimed is:

1. A method of manufacturing an electrolytic capacitor, comprising:

forming a capacitor element by winding an anode foil and a cathode foil in a manner that a separator is interposed therebetween, the anode foil having a dielectric oxide film thereon, the cathode foil being subjected to a treatment enlarging surface area;

immersing the capacitor element in a fluid dispersion containing conductive polymer fine particles dispersed therein;

depressurizing the capacitor element and drying the capacitor element, after the immersing the capacitor element in the fluid dispersion so that the conductive polymer fine particles adhere to surfaces of fibers of the separator, fill between the fibers of the separator, and adhere to surfaces of the anode foil and the cathode foil in a manner that the adhesion and filling of the conductive polymer fine particles are such that an amount of the fine particles decreases from ends toward a center of the capacitor element;

impregnating the capacitor element with an electrolytic solution after the adhesion and filling of the conductive polymer fine particles;

placing the capacitor element in a bottomed, metallic case; and sealing an opening of the metallic case with a sealing member.

2. The method of manufacturing an electrolytic capacitor according to claim 1, wherein the fluid dispersion of the conductive polymer fine particles includes a surface active agent.

3. The method of manufacturing an electrolytic capacitor according to claim 1, wherein the cathode foil has one of an oxide, a carbide, and a nitride thereon.

4. The method of manufacturing an electrolytic capacitor according to claim 1, wherein a density of the separator is equal to or smaller than 0.4 g/cm$^3$.

5. The method of manufacturing an electrolytic capacitor according to claim 1, wherein a molten salt electrolyte is used as an electrolyte of the electrolytic solution.

6. The method of manufacturing an electrolytic capacitor according to claim 5, wherein number of moles of an acid component is larger than number of moles of a base component in the electrolyte of the electrolytic solution.

* * * * *